United States Patent
Mei et al.

(10) Patent No.: US 9,349,062 B2
(45) Date of Patent: May 24, 2016

(54) CHARACTER RECOGNITION METHOD AND DEVICE

(71) Applicant: Tencent Technology (Shenzhen) Company Limited, Shenzhen Guangdong (CN)

(72) Inventors: Shuqi Mei, Shenzhen Guangdong (CN); Yongjun Chen, Shenzhen Guangdong (CN); Boxing Liu, Shenzhen Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/604,077

(22) Filed: Jan. 23, 2015

(65) Prior Publication Data

US 2015/0131908 A1    May 14, 2015

Related U.S. Application Data

(63) Continuation of application No. PCT/CN2014/081663, filed on Jul. 4, 2014.

(30) Foreign Application Priority Data

Jul. 16, 2013    (CN) .......................... 2013 1 0297948

(51) Int. Cl.
*G06K 9/18*    (2006.01)
*G06K 9/46*    (2006.01)
(Continued)

(52) U.S. Cl.
CPC  *G06K 9/18* (2013.01); *G06K 9/325* (2013.01); *G06K 9/3266* (2013.01); *G06K 9/38* (2013.01);
(Continued)

(58) Field of Classification Search
None
See application file for complete search history.

(56) References Cited

U.S. PATENT DOCUMENTS 6,519,360 B1 *   2/2003   Tanaka ........................... 382/162
7,167,281 B1 *   1/2007   Fujimoto .................. G06K 9/38
                                                           358/401

(Continued)

FOREIGN PATENT DOCUMENTS

CN    101599125 A    12/2009
CN    102331990 A    1/2012
(Continued)

OTHER PUBLICATIONS

Thillou, C., and Bernard Gosselin. "Color binarization for complex camera-based images." Electronic Imaging 2005. International Society for Optics and Photonics, 2005.*

(Continued)

*Primary Examiner* — Michelle Entezari
(74) *Attorney, Agent, or Firm* — Brinks Gilson & Lione

(57) ABSTRACT

A character recognition method may include at least the following steps. A location step may include acquiring an image and locating a character region of the image. The character region may include a character and a local background. The method may further include a background judgment step for determining whether the local background is a complex background; a determination step for determining a color of the character if the local background is a complex background; a construction step for constructing a mask for the character by combining the color of the character and a character region; and a first recognition step for extracting the character from the character region by using the mask, recognizing the character, and outputting the recognition result. A character recognition device is further provided.

20 Claims, 11 Drawing Sheets

(51) Int. Cl.
  *G06T 7/40* (2006.01)
  *G06K 9/32* (2006.01)
  *G06K 9/38* (2006.01)

(52) U.S. Cl.
  CPC . *G06K 9/46* (2013.01); *G06T 7/408* (2013.01); *G06K 2009/4666* (2013.01); *G06K 2209/01* (2013.01)

(56) References Cited

U.S. PATENT DOCUMENTS

| | | | |
|---|---|---|---|
| 7,505,626 B1* | 3/2009 | Stolin et al. | 382/176 |
| 7,636,470 B2* | 12/2009 | Chen et al. | 382/165 |
| 7,636,472 B2* | 12/2009 | Maruoka | 382/167 |
| 7,805,007 B2* | 9/2010 | Sanford | 382/199 |
| 8,073,251 B2* | 12/2011 | Matsuoka et al. | 382/167 |
| 8,763,038 B2* | 6/2014 | Candelore | 725/39 |
| 8,825,670 B2* | 9/2014 | Masuko | 707/748 |
| 8,837,836 B2* | 9/2014 | Kondo et al. | 382/195 |
| 8,855,414 B1* | 10/2014 | Hobbs | G06T 9/00 382/166 |
| 8,989,515 B2* | 3/2015 | Shustorovich et al. | 382/274 |
| 2002/0097915 A1* | 7/2002 | Hotta | G06K 9/723 382/229 |
| 2003/0198386 A1 | 10/2003 | Luo | |
| 2004/0170316 A1* | 9/2004 | Saquib | H04N 1/4072 382/162 |
| 2005/0129311 A1* | 6/2005 | Haynes | G06K 9/00248 382/170 |
| 2007/0098262 A1* | 5/2007 | Malik | G06K 9/38 382/169 |
| 2007/0189615 A1* | 8/2007 | Liu | G06K 9/38 382/232 |
| 2008/0273807 A1* | 11/2008 | Dauw | G06K 9/00456 382/237 |
| 2009/0055778 A1* | 2/2009 | Abdelazim | G06F 3/0488 715/860 |
| 2009/0161991 A1* | 6/2009 | Nestares | G06K 9/3208 382/296 |
| 2010/0073735 A1* | 3/2010 | Hunt | G06T 3/0031 358/462 |
| 2010/0191532 A1* | 7/2010 | Rodriguez Serrano | G06K 9/00879 704/256.7 |
| 2011/0002535 A1* | 1/2011 | Jia | G06K 9/4652 382/165 |
| 2011/0051948 A1* | 3/2011 | Boldt | H04R 25/505 381/73.1 |
| 2011/0258195 A1* | 10/2011 | Welling | G06K 9/00442 707/740 |
| 2012/0087587 A1* | 4/2012 | Kacher | G06K 9/38 382/182 |
| 2012/0113489 A1* | 5/2012 | Heit | G06K 9/186 358/518 |
| 2012/0134581 A1* | 5/2012 | Matsuda | H04N 1/56 382/164 |
| 2014/0023267 A1* | 1/2014 | Aizawa | G06K 9/3266 382/164 |

FOREIGN PATENT DOCUMENTS

| | | |
|---|---|---|
| CN | 102968637 A | 3/2013 |
| CN | 103268481 A | 8/2013 |

OTHER PUBLICATIONS

Garcia, C., and X. Apostolidis. "Text detection and segmentation in complex color images." Acoustics, Speech, and Signal Processing, 2000. ICASSP'00. Proceedings. 2000 IEEE International Conference on. vol. 6. IEEE, 2000.*

Wang, Bin, et al. "Color text image binarization based on binary texture analysis." Pattern Recognition Letters 26.11 (2005): 1650-1657.*

International Search Report, dated Sep. 30, 2014, pp. 1-5, issued in International Application No. PCT/CN2014/081663, State Intellectual Property Office of the P.R. China, Beijing, China.

* cited by examiner character recognition in a complex background

CHARACTER RECOGNITION METHOD AND DEVICE

This application is a continuation application of International Application No. PCT/CN2014/081663, titled "Character recognition method and device," filed on Jul. 4, 2014, which claims priority to Chinese patent application No. 201310297948.3 titled "Character recognition method and device," and filed with the State Intellectual Property Office on Jul. 16, 2013, which are incorporated herein by reference in their entirety.

TECHNICAL FIELD

This application relates to information processing technology and in particular to character recognition.

BACKGROUND

Image capturing devices such as a camera, and/or a scanner, are being widely used. Therefore, information may be communicated via an image more conveniently. An image may have one or more characters embedded in the image. The characters may express semantic contents of the image, and/or a context of the image. Thus, the characters may provide information to the people viewing the image. For example, the character in the image may be an overview of the image. If an apparatus, such as a computer automatically extracts and recognizes the characters in the image, the computer may identify the contents of the image. Such recognition of the characters may be beneficial for storage, classification, understanding, and retrieval of the image and/or a video. Thus, recognition of the characters in the image, similar to human beings, may have wide application and commercial value. However, the current Optical Character Recognition (OCR) systems, such as Tesseract OCR, OpenRTK OCR, TypeReader OCR, and Thunis OCR are used for character recognition in simple background, and cannot perform character recognition in a complex background.

SUMMARY OF THE INVENTION

Therefore, it is necessary to provide a character recognition method and device, which may improve accuracy for character recognition, particularly in a complex background.

A character recognition method includes the following steps: a location step for acquiring an image and locating a character region of the image. The character region may comprise a character and a local background. All parts of the character region except the character itself may be considered the local background. The method may further include a background judgment step for determining whether the local background is a complex background; a determination step for determining a color of the character. The determination step may be performed if the local background is a complex background. The method may further include a construction step for constructing a mask for the character by combining the color of the character and a color of the character region; and a first recognition step for extracting the character stroke pixels from the character region by using the mask, recognizing the character, and outputting the recognition result.

A character recognition device may include a location module to acquire an image, and locate a character region of the image. The character region may include a character and all the other parts of the character region, except the character, may be considered a local background. The character recognition device may further include a background judgment module to identify the local background as a complex background. A determination module of the device may determine a color of the character if the local background is a complex background. A construction module may construct a mask for the character by combining the color of the character and the character region; and a first recognition module may extract the character stroke pixels from the character region by using the mask, recognize the extracted character, and output the recognition result.

Thus, the character recognition method and device according to the present disclosure, after the character region is located in the image, if it is determined that the background of the character in the character region is a complex background, a mask for the character may be constructed based on a color of the character and the character region. The character stroke pixels may then be extracted by using the mask, and the character may be recognized with accuracy.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

First Embodiment

Figure 1:
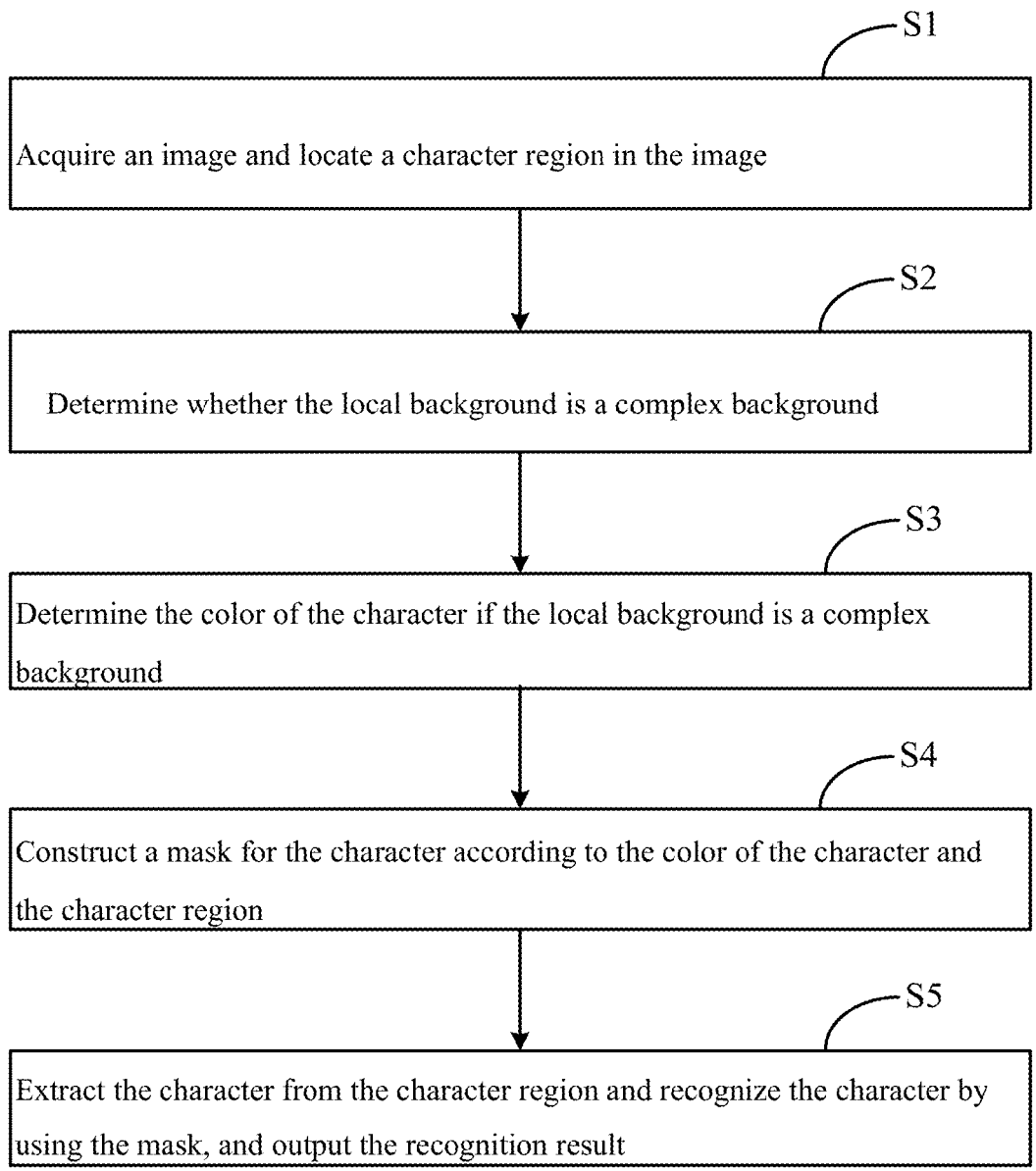
FIG. 1 illustrates a flowchart of a character recognition method according to a first embodiment.
Figure 2:
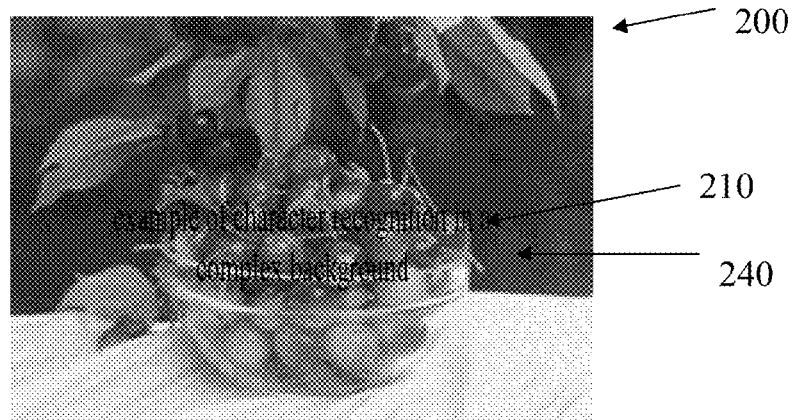
FIG. 2 to FIG. 5 are illustrations of images.

FIG. 1 illustrates a flowchart of a character recognition method according to a first embodiment. The character recognition method may include at least Steps S1-S5.

Step S1 may include acquiring an image, and locating a character region of the image. The character region may include one or more parts, in which parts of the character region other than a character itself form a local background.

Step S2 may include determining whether the local background is a complex background.

Step S3 may include determining a color of the character if the local background is a complex background. A local background may be deemed as a complex background if identifying the character from the local background is difficult, for example due to the local background being complicated, or because the character being entangled with the local background due to character and the local background having a similar color.

Step S4 may include constructing a selected region as a mask for the character by combining the color of the character and the character region.

Step S5 may include extracting character stroke pixels from the character region by using the mask. The step S5 may further include performing character recognition on the character stroke pixels to recognize the character, and outputting the recognition result.

According to the character recognition method, after the character region is located in the image, if the background of the character in the character region is determined to be a complex background, the selected region is constructed as the mask for the character. The selected region is created, or generated, according to the color of the character and the character region. Character stroke pixels are extracted by using the mask. The character stroke pixels, and thus the character is recognized. The character in the complex background may thus be recognized accurately.

In some examples, the steps of the character recognition method may be implemented as follows.

FIG. 2, FIG. 3, FIG. 4, and FIG. 5, illustrate an example image 200 to be processed by the character recognition method. There are one or more characters, including character 210, in the image. The image 200 may be captured by using an image capturing device such as a camera (digital, optical, or a combination), a webcam, and/or a scanner. Parts of the image other than the characters themselves are referred as a background of the image. In order to be different from the local background, the background of the image is hereinafter referred as a whole background. That is, the image 200 includes the character 210 and the whole background 240.

The detection and location of the character 210 may be based on analysis of an edge, analysis of a texture, analysis of a region or learning. The detection and location of the character may be adopted to detect the character 210 in the image 200 according to color coherency and/or stroke connectivity of the character 210. The method may include locating a character region in the image 200 and acquiring information such as position coordinate of the character region in the image 200. The method may also include determining stroke information and angle of inclination of the character 210 in the character region. The parts of the character region except the character 210 itself may be referred as a local background.

Detecting the character 210 presented in the image 200, generally based on the stroke information of the character 210 obtained by using the above-mentioned detection and location method may be quick but not entirely accurate. Some parts in the local background connected to the character 210 may be misjudged as a stroke of the character 210. For example, in FIG. 5, a part of the person's hair connected to the character "fa(发)" may be misjudged as a stroke of the character "fa(发)".

In Step S2, a binary graph may be generated. The binary graph may be generated according to the position coordinate of the character region and the stroke information of the character 210. The positions of the pixels of the binary graph may have a one-to-one correspondence with the positions of the pixels of the image 200. The binary graph may include a first pixel group with a gray level being a first preset value, such as 255, and a second pixel group with a gray level being a second preset value, such as 0. The first pixel group may correspond to the character 210 in the image 200 and the second pixel group may correspond to the whole background 240 of the image 200.

Figure 3:
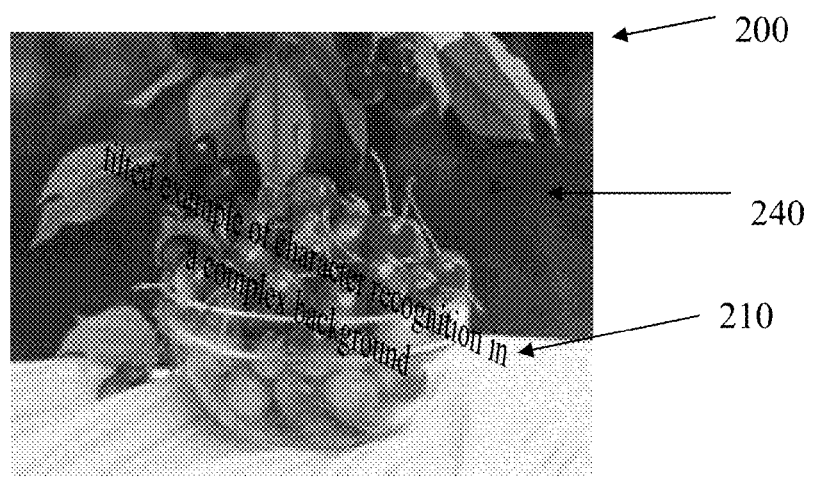
Figure 6:
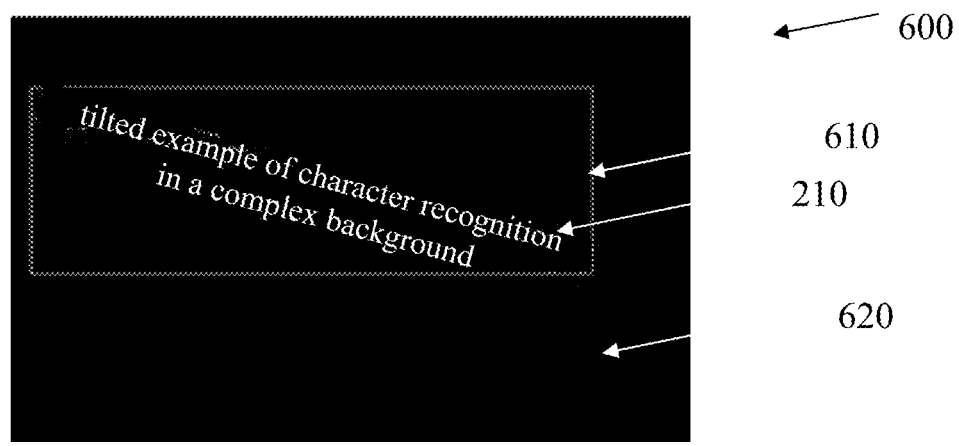
FIG. 6 illustrates a binary graph corresponding to the image in FIG. 3.

FIG. 6 illustrates an example binary graph 600 of the image 200 in FIG. 3. The binary graph 600 may be generated according to the location of the character region and the acquired stroke information of the character 210 in FIG. 3. A first pixel group 610 of the binary graph 600 may be white and a second pixel group 620 of the binary graph 600 may be black, which makes the binary graph to exhibit a black-and-white effect, or image. The white part may be formed according to the stroke information of the character and may be used to reflect the character 210 in the image 200. The parts of the binary graph 600 except the white part are black and, the black parts are used to reflect the whole background 240 of the image 200. Since the acquired stroke information of the character 210 may not be entirely accurate, the character 210 reflected by the first pixel group 610 of the binary graph 600 may not be exactly the same as the character 210 in the image 200. The first pixel group 610 may be a rough, uneven, and/or approximate, representation of the character 210 in the image 200; and the second pixel group 620 may be a rough, uneven, and/or approximate representation of the whole background 240 of the image 200.

Figure 7:
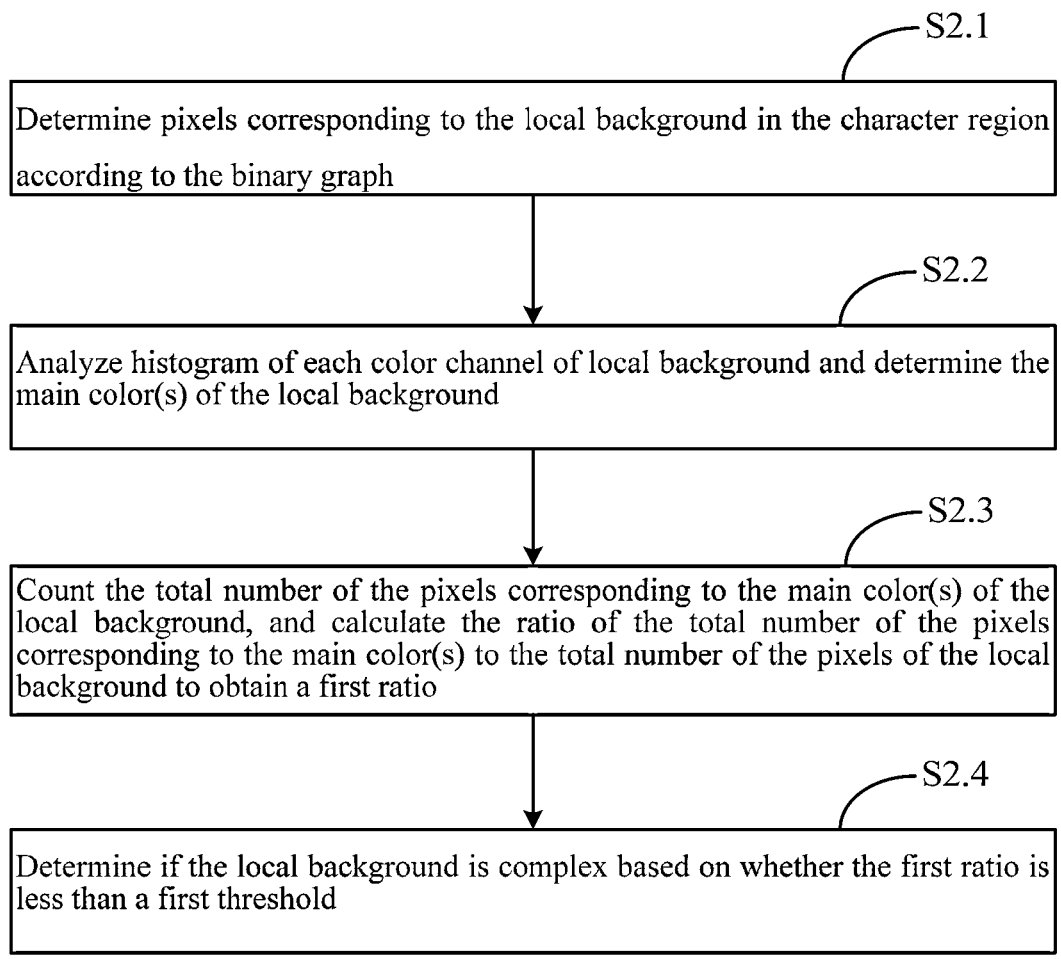
FIG. 7 is a flowchart of an example method for determining whether a local background is a complex background.

FIG. 7 illustrates a flowchart of an example method for determining whether the local background is a complex background.

Figure 8:
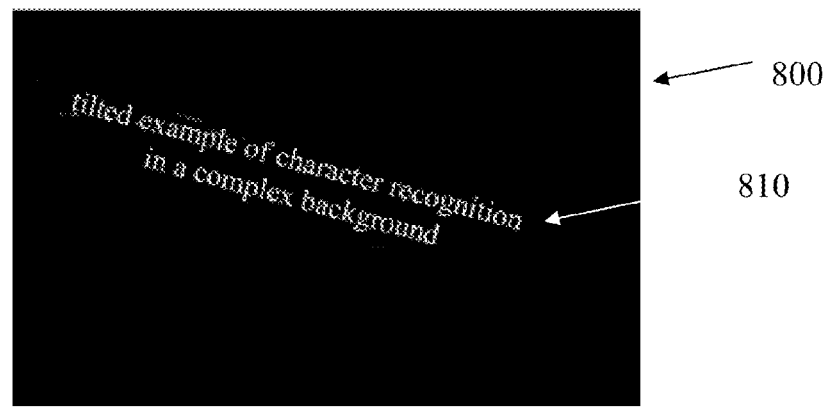
FIG. 8 is an expanded view of the binary graph shown in FIG. 6.

In Step S2.1, pixels corresponding to the local background in the character region may be determined based on the binary graph 600. A specific region corresponding to the character region may be identified in the binary graph 600 according to the position coordinate of the character region. The pixels in the specific region with gray level set to the second preset value, i.e. the pixels corresponding to the local background in the character region, may be identified. The identified pixels in the specific region may have a one-to-one correspondence to pixels in the character region. Furthermore, before Step S2.1, the binary graph 600 may be expanded by using a morphological method. Accordingly, the first pixel group 610 of the binary graph 600 may cancel noise at an edge of the character 210. The noise may be introduced due to compression. The noise cancellation may prevent the noise from affecting the subsequent statistics of the pixels of the local background or the whole background 240. FIG. 8 illustrates an expanded binary graph 800 which may be a result of the expansion of the binary graph 600 of FIG. 6. As illustrated, the white character 810 in FIG. 8 is bold relative to the character 210 in FIG. 6.

Figure 9:
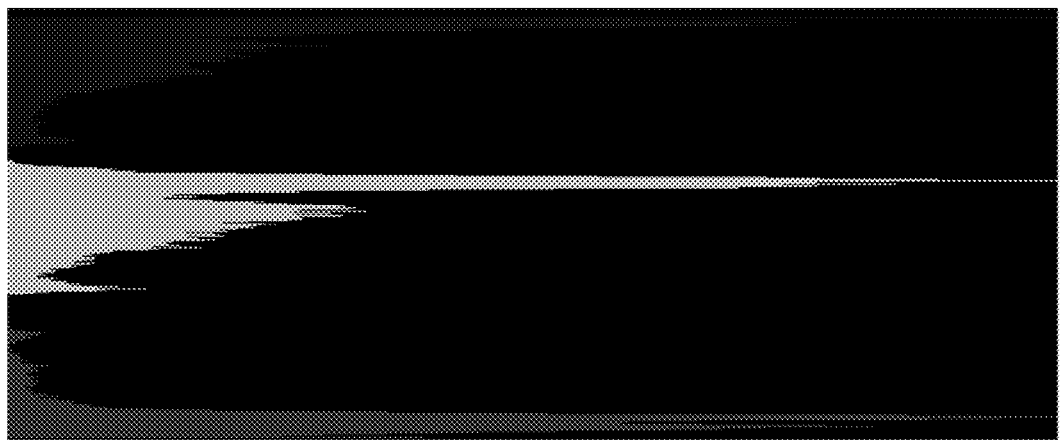
FIG. 9 is an example histogram for color channels.

In Step S2.2, the histogram of statistics of each color channel in the image 200 may be generated and/or analyzed. The histogram may be based on the pixels corresponding to the local background. A main color of the local background may be identified during this step. In an example of a 256-dimensional RGB color model, the number of the pixels corresponding to each value of R (Red) channel in the range of 0-255, the number of the pixels corresponding to each value of G (Green) channel in the range of 0-255, and the total number of the pixels corresponding to each value of B (Blue) channel in the range of 0-255, may be counted. Further, the total number of pixels in the local background may be counted. The histogram of color channels may be generated based on the counts. A histogram for each color channel, R, G, and, B, in the above example, may be generated and analyzed. FIG. 9 illustrates an example histogram of a color channel.

A channel with maximum number of pixels is identified. The value of the color channel corresponding to the maximum number of pixels is extracted from the color histogram of each color channel. The extracted values of the color channels corresponding to the maximum number of pixels in all color channels are combined into the main color. For example, in the color histogram of R channel if the R value with the maximum number of pixels is 20, in the color histogram of G channel the G value with the maximum number of pixels is 30, and in the color histogram of B channel the B value corresponding to the maximum number of pixels is 50, the color with RGB value of (20, 30, 50) may be set as the main color. Furthermore, a range d may be set, and the values within the range d of the extracted value (main color+/−d) of the color channel considered to be the main color. Continuing the previous example, all the colors combined by the R value in range of (20−d, 20+d), the G value in range of (30−d, 30+d) and the B value in range of (50−d, 50+d) may be taken as the main color. In another example, the color combined by the values of the color channels in which the ratio of the number of the pixels corresponding to the value of the color channel to the total number of the pixels of the local background reaches a preset threshold, such as 5%, may be considered as the main color. The local background may have more than one main color.

In Step S2.3, the total number of the pixels corresponding to the main color of the local background may be counted. The ratio of the total number of the pixels corresponding to the main color of the local background to the total number of the pixels of the local background may be calculated to obtain a first ratio.

In Step S2.4, it may be determined, or judged, whether the first ratio is less than a first threshold. If the first ratio is less than the first threshold, the local background may be considered as a complex background. The first threshold may be an empirical value obtained from a large number of samples.

Figure 10:
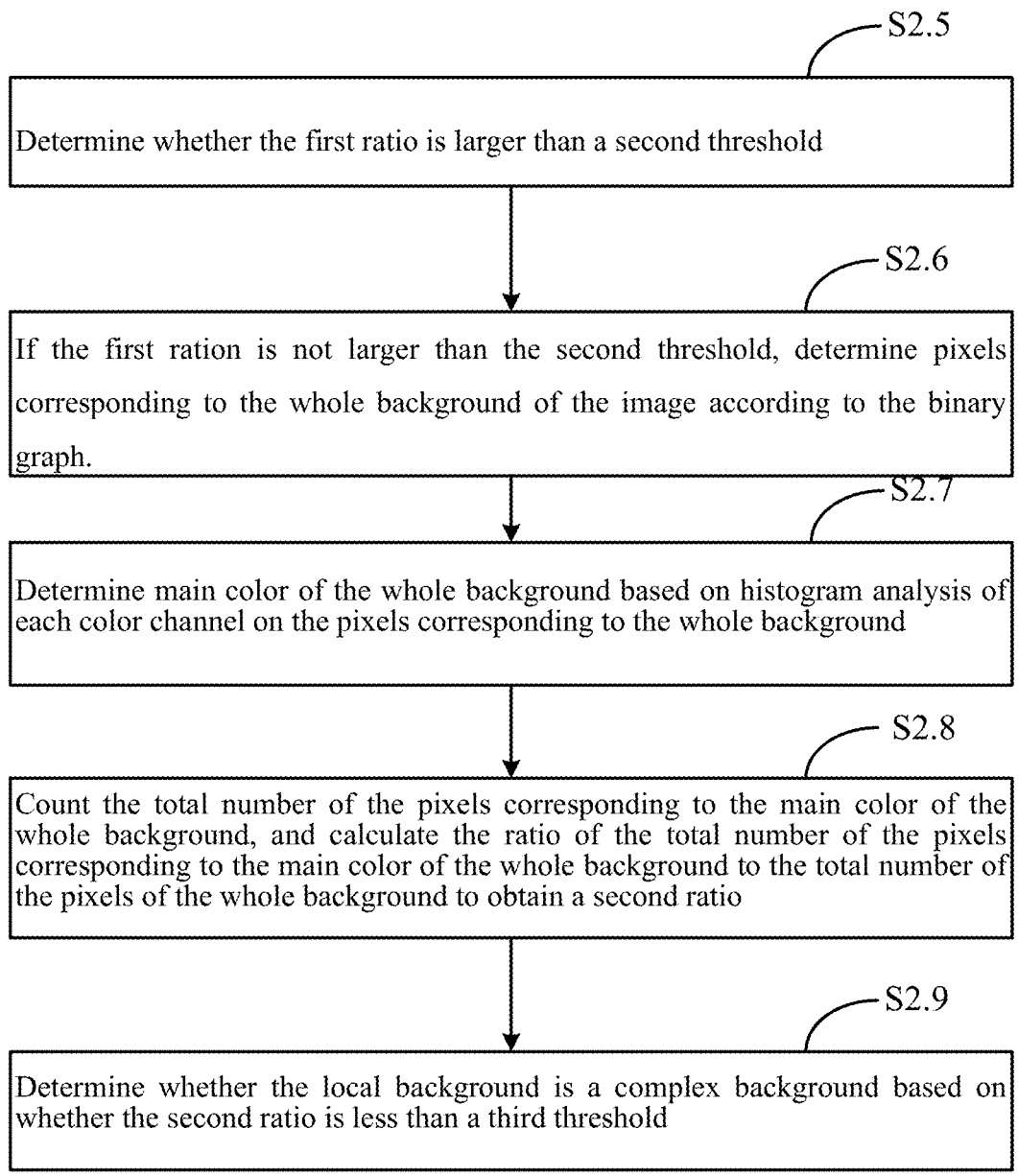
FIG. 10 is a flowchart for an example method for judging whether a background of an image is a complex background.

In addition, if the first ratio is not less than the first threshold, the local background may not be simply adjudged as a simple, or a non-complex background. Instead, to determine whether the local background is a complex background, the whole background 240 may be used. This may improve the accuracy for the subsequent character recognition. FIG. 10 illustrates a flowchart of an example method for determining whether the local background is a complex background, in case the first ratio is not less than the first threshold. The method may include at least the following steps.

Step S2.5 may be performed if the first ratio is not less than the first threshold. In Step S2.5, it may be determined, or judged, whether the first ratio is larger than a second threshold.

In Step S2.6, if the first ratio is not larger than the second threshold, pixels corresponding to the whole background 240 of the image 200 may be determined according to the binary graph 600. Specifically, the pixels in the image 200 corresponding to the pixels whose gray level is the second preset value 620 in the binary graph 600, i.e. the pixels corresponding to the whole background 240 of the image 200, may be identified. The pixels in the whole background 240 may be identified according to a one-to-one correspondence between pixel positions in the image 200 and the binary graph 600. In Step S2.6, the pixels corresponding to the whole background 240 of the image 200 may be determined by using the expanded binary graph 800.

In Step S2.7, the histogram statistics for the color of each color channel may be performed on the pixels corresponding to the whole background 240, and a main color of the whole background 240 is determined. The main color of the whole background may be determined similar to determination of the main color of the local background in Step S2.2 described elsewhere, and is not repeated here.

In Step S2.8, the total number of the pixels corresponding to the main color of the whole background 240 may be counted. A ratio of the total number of the pixels corresponding to the main color of the whole background 240 to the total number of the pixels of the whole background 240 may be calculated to obtain a second ratio.

In Step S2.9, the second ratio may be compared to a third threshold. If the second ratio is less than the third threshold, it the local background may be adjudged a complex background. The second threshold and the third threshold may be empirical values obtained from a large number of samples.

Figure 11:
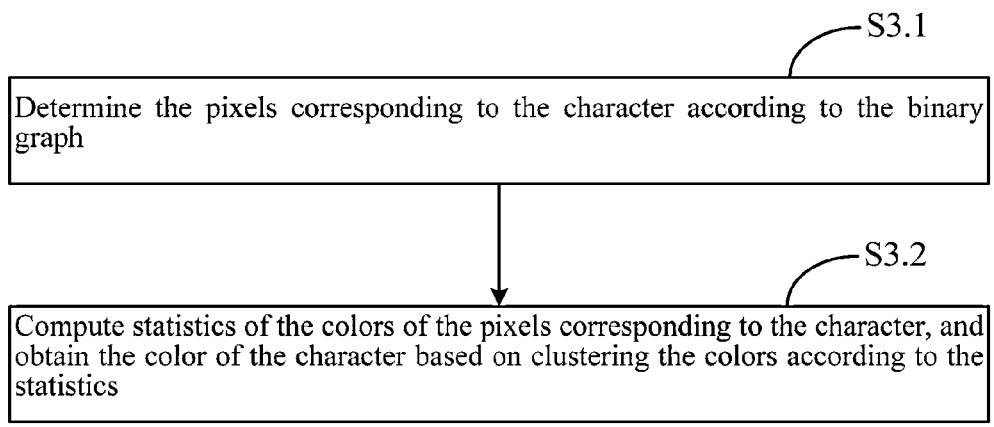
FIG. 11 is a flowchart of example steps during character recognition.

FIG. 11 illustrates a flowchart of an example method to determine color of the character. As shown in FIG. 11, Step S3 may include Steps S3.1-S3.2.

In Step S3.1, the pixels corresponding to the character 210 may be determined according to the binary graph 600. A particular region corresponding to the character region may be identified in the binary graph according to the position coordinate of the character region in the image 200. The pixels in the character region corresponding to the pixels with first preset gray level in the particular region, i.e. the pixels corresponding to the character in the character region, may be identified according to a one-to-one correspondence between pixels in the particular region and pixels in the character region.

In Step S3.2, statistics for the colors of the pixels corresponding to the character may be computed and analyzed. The colors of the pixels may be clustered based on the statistics to determine the color of the character. For example, the colors of the pixels may be clustered according to a preset number of classes by using a clustering algorithm on the statistics. For example, the colors of the pixels may be clustered into 5 classes. The colors that have a color distance less than a preset value, such as 20, from a preset class, may be considered to be a separate, undetermined color. If there are several classes of undetermined colors, the undetermined color unfit for the character may be excluded from the several classes of the undetermined colors. A remaining undetermined color is deemed as the color of the character. The color of the character may include one or more classes of color. For example, in a line of characters, several characters may be set in colors different from one another, for example to make the characters more visible, coherent, attractive, or contrast.

Typically, a pixel is seldom misjudged as the stroke of the character. For example, the method for excluding the color unfit for the character 210 from the undetermined colors may be based on counting the number of the pixels corresponding to each undetermined color in the pixels corresponding to the character. An undetermined color of which the number of the corresponding pixels is less than a certain preset value may be excluded. Further, since the texture feature and the gradient feature of pixels that may be misjudged as part of the character in the local background may be generally different from that of the character. For example, the texture feature and the gradient feature of the person's hair may be different from that of the character in FIG. 5. And therefore, the undetermined color unfit for the character may also be excluded based on information such as the texture feature and the gradient feature formed by the pixels corresponding to the undetermined color. Furthermore, the undetermined color unfit for the character may also be excluded according to the color coherency of the character.

Figure 12:
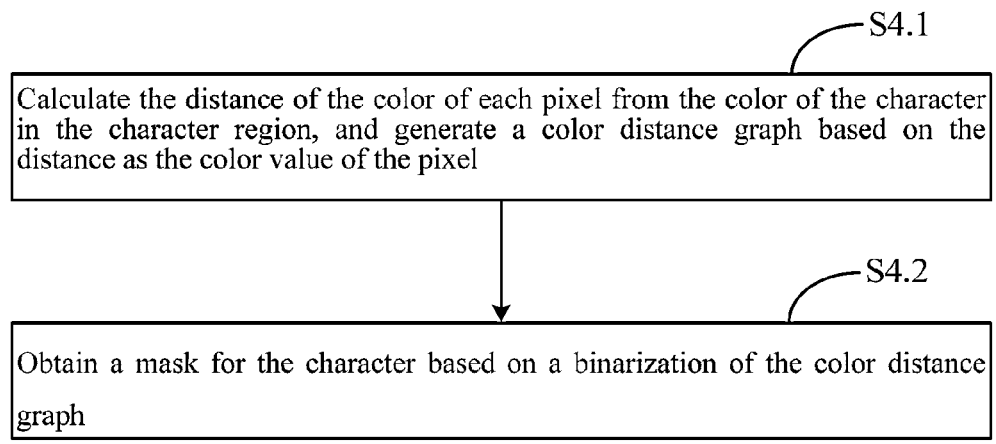
FIG. 12 illustrates a flowchart of an example method to construct a mask for a character.

FIG. 12 illustrates a flowchart of an example method to construct a mask for a character. Step S4 may include at least Steps S4.1-S4.2.

In Step S4.1, the distance of the color of each pixel in the character region from the color of the character may be calculated. Further, a color distance graph may be generated by using the distance as the color value of the pixel. For example, assume the color of the character is (200, 200, 200) in RGB. The distance of the color of a specified pixel from the color of the character may be obtained by subtracting the RGB value of the character from the RGB value of the specified pixel in the character region. Then, the color value of the pixel, of which the pixel position is the same as the specified pixel position, in an intermediate graph, or image, is set as the obtained distance. Pixel positions in the middle graph may have one-to-one correspondence to that of the character region. The color distance graph may be obtained after the color value of each pixel in the middle graph is set as the distance of the color at the same pixel position from the color of the character in the character region. If the color of the character determined in Step S3 includes more than one color, a pixel corresponding to the color of the character which is nearest in spatial distance from the specified pixel may be identified. The distance of the color of the specified pixel from the color of the character corresponding to the nearest pixel may then be calculated and used.

Figures 13, 14:
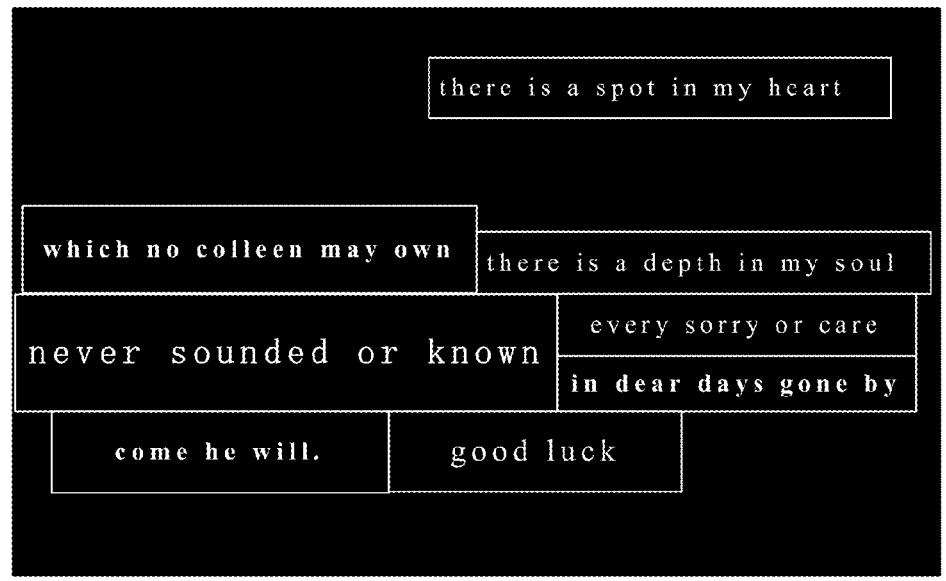
FIG. 13 illustrates an example mask corresponding to the character region in FIG. 2.
FIG. 14 illustrates an example result of performing layout analysis on a mask.

In Step S4.2, a binarization process may be performed on the color distance graph to obtain the mask. For example, FIG. 13 illustrates a mask of the character region in FIG. 2. The binarization process on the color distance graph may be a local-adaptive binarization. In Step S4.2, spot noise may be removed from the mask. Furthermore, if the angle of inclination of the character obtained in Step S1 is not 0, a tilt correction on the character region may be performed on the character region and/or the mask according to the obtained angle of inclination.

Step S5 may include extraction of the character stroke pixels in the character region by using the mask. Prior to the extraction, a layout analysis and single character segmentation may be performed on the mask. The character in the mask may be segmented into several character rows or several character columns by performing layout analysis. The character rows and/or character columns may be segmented into single characters by performing single character segmentation. Thus, the stroke pixels for each character may be extracted from the character region by using the mask.

During step S5, it may be determined whether the character 210 in the character region is horizontal or vertical. For example, the mask may be scanned in pixels row-by-row and/or column-by-column to identify and analyze row space and column space of the character in the mask. Based on the analysis, height variance of the character row and width variance of the character column may be calculated. The height variance of the character row represent consistency of the height of the character row and the width variance of the character column may represent the consistency of the width of the character column. Whether the character is horizontal or vertical may be determined by considering various factors such as spaces between successive characters and the consistency of the height of multiple character rows or consistency of the width of multiple character columns. For example, if the row space is larger than the column space and the height of the character row is consistent, the character in the character region may be adjudged, or identified as being horizontal. Alternatively or in addition, if the column space is larger than the row space and the width of the character column is consistent, the character 210 in the character region may be adjudged, or identified as being vertical.

The mask may be horizontally segmented and/or vertically segmented several times. Considering an example in which the character 210 in the character region is horizontal, the mask may first be horizontally segmented and the characters in the mask may be segmented into several character rows. The horizontal segmentation may include scanning the pixels of the mask row-by-row and segmenting the up character row and the down character row by using a pixel row which is obtained by the scan as a segmentation line, and wherein the pixel row does not include a character. Then it may be determined whether to vertically segment the characters which have been previously horizontally segmented. The determination whether to segment vertically may depend on the ratio of the width to the height of the segmented character row. The characters in a single row and the characters in multiple rows in the character rows, which were horizontally segmented previously, may be segmented. The vertical segmentation may include scanning the pixels of the mask column-by-column and segmenting the right character column and the left character column by using a pixel column, which is obtained by the scan as a segmentation line, and when the pixel column does not include a character. Then the characters in multiple rows obtained after the last vertical segmentation may be horizontally segmented into the characters in single row according to the ratio of the width to the height of the segmented character row, and so on. Finally, the vertical segmentation may be performed and all of the characters in a single row may be segmented into single characters.

Conversely, if the character 210 in the character region is vertical, first the mask may be vertically segmented and the characters in the mask may be segmented into several character columns. Whether to horizontally segment the character 210, which has been vertically segmented may be determined depending on the ratio of the width to the height of the segmented character column. The characters in single column and the characters in multiple columns in the character columns, which may have been vertically segmented are segmented. Then the characters in multiple columns obtained after the last horizontal segmentation may be segmented into characters in a single column according to the ratio of the width to the height of the segmented character row, and so on. Finally, the horizontal segmentation may be performed once and all of the characters in single column may be segmented into single characters.

Figure 15:
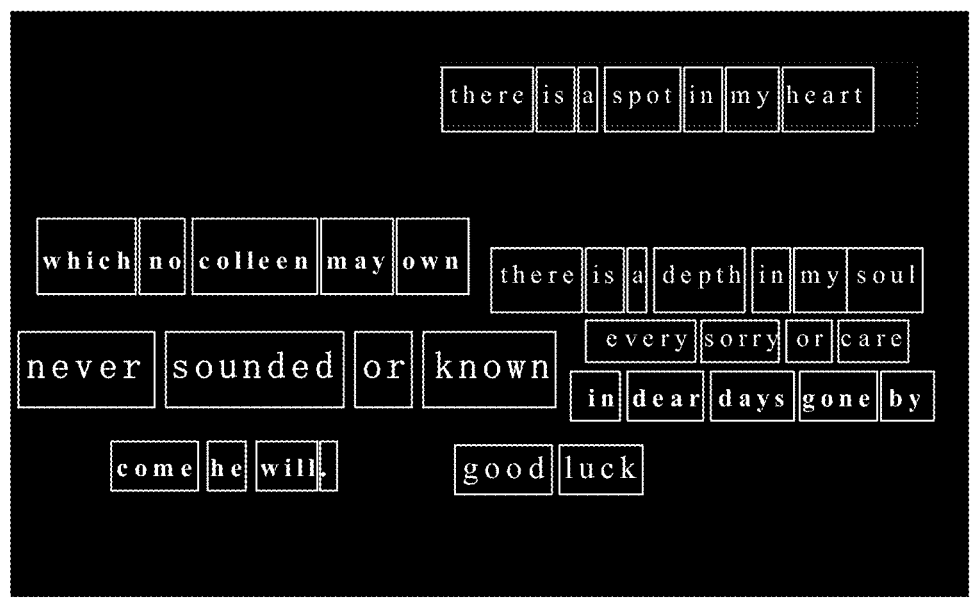
FIG. 15 illustrates an example result of performing single character segmentation on the mask in FIG. 14.

The segmentation result of the mask may be corrected. For example, the character rows or the character columns which may be segmented by mistake may be merged, or the segmentation by mistake for the first letter and the second letter in English may be corrected. The mask by which stroke pixels for each character were extracted from the character region may be obtained. For example, FIG. 14 illustrates an example result of performing layout analysis on a mask, and FIG. 15 illustrates an example result of performing single character segmentation on the mask in FIG. 14.

Before the extraction of the character from the character region by using the mask on which layout analysis and single character segmentation are performed, the mask may further be expanded. Then the gradient of the character edge may be retained. Further, interference of the gradient of the local background may be removed by using the mask. Thus, each character may be extracted from the character region. The extracted character may be normalized, that is, all characters are zoomed, or scaled to a uniform size. Further yet, features of each character may be extracted and recognized, or identified.

If the color of the character determined in Step S3 includes more than one color, for example, two colors, then the Step S4.1 and Step S4.2 may be performed separately for each color. For example, in case of two colors, steps S4.1 and S4.2 may be performed respectively for a first color of the character and a second color of the character, to obtain a first mask corresponding to the first color of the character and a second mask corresponding to the second color of the character. Then layout analysis and single character segmentation in the subsequent Step S5 are performed for both, the first mask and the second mask. Each character may be extracted from the character region and recognized according to the first mask and the second mask. The characters may be corrected with reference to each other, and the more accurate recognition result may be obtained, retained, and used in further steps.

Figure 5:
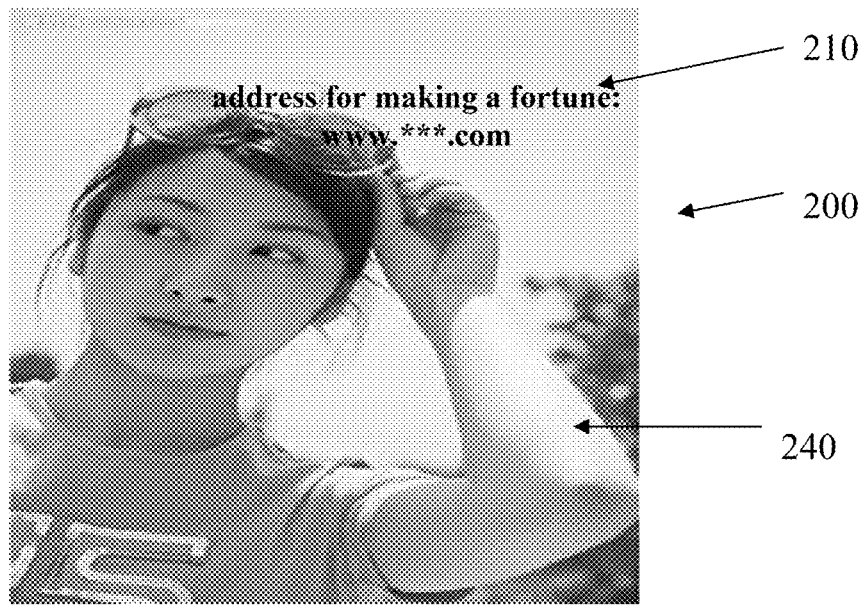

According to the character recognition method of this embodiment, recognition of characters in a complex background may be accurately performed. In practice, the character recognition method of this embodiment may be further combined with text filtering techniques to recognize a character from the complex background of the image more accurately. Based on the recognized characters, the text in the image may be identified and analyzed for sensitivity. For example, the identified text may contain sensitive, or malicious text such as, "address for getting rich" as shown in FIG. 5. Based on the text, maliciousness of the image may be determined. Further, based on the determined maliciousness, further actions associated with the image 200 may be actively taken, or actively prevented. Thereby the user security may be improved.

Second Embodiment

Figure 16:
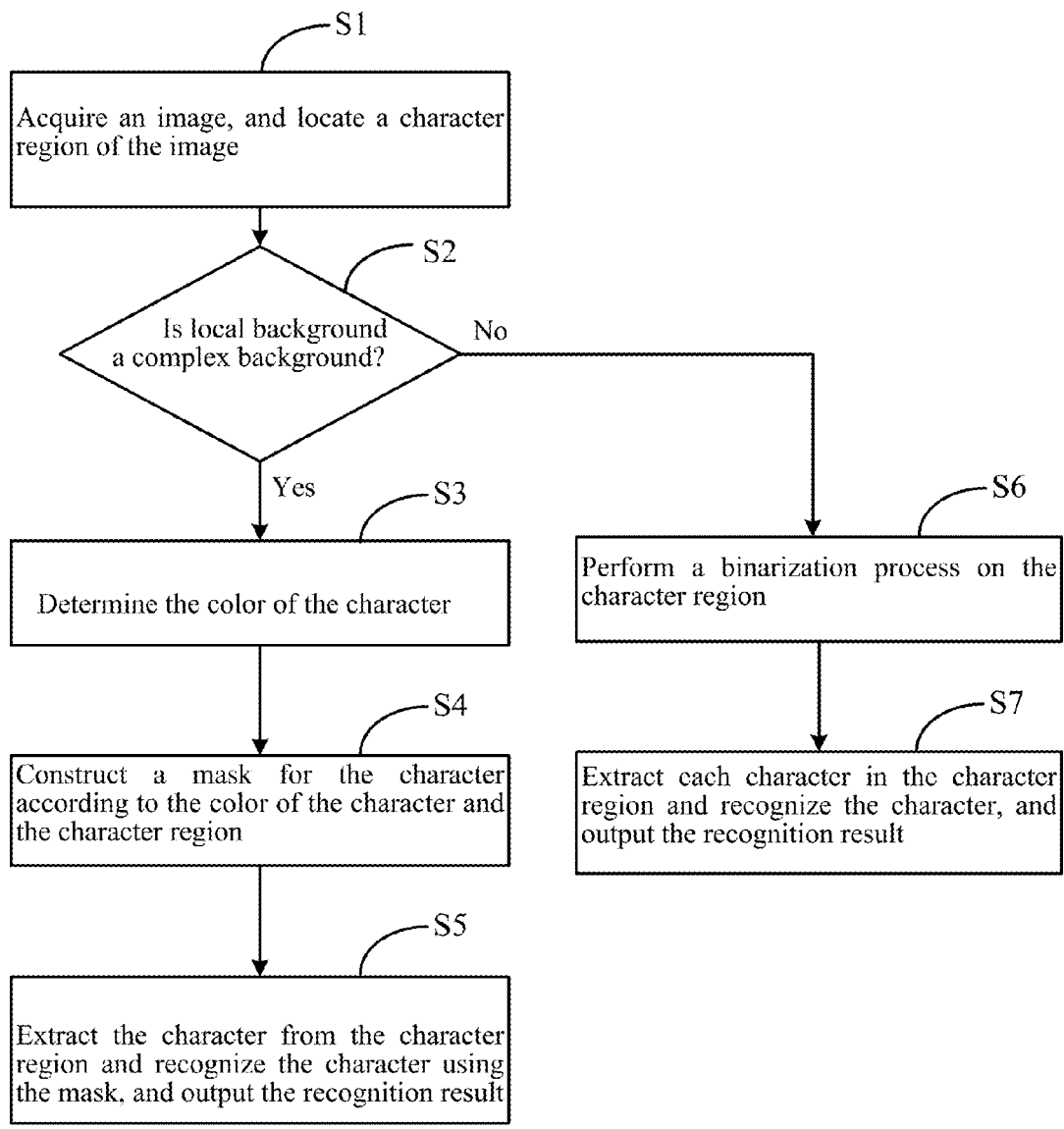
FIG. 16 is a flowchart of an example character recognition method according to a second embodiment.

In the character recognition method according to the first embodiment, in the case that the local background of the character region is the complex background, the mask may be constructed according to the color of the character and the character region to accurately extract the character for recognition. However, the process for constructing the mask is complex, which may reduce the efficiency of extraction and recognition of the character. In contrast, if the local background of the character region is not a complex background, the character 210 may be accurately extracted and recognized without constructing the mask. Therefore, in the process of extracting and recognizing the character in the image 200, a better balance between the accuracy and the efficiency, a character recognition method is provided according to the second embodiment. FIG. 16 illustrates a flowchart of an example method according to the second embodiment. The character recognition method may include the steps S1-S7, of which steps S1 to S5 are similar to those described for the first embodiment, described elsewhere in this document. Steps S6 and S7 are described below.

Figure 4:
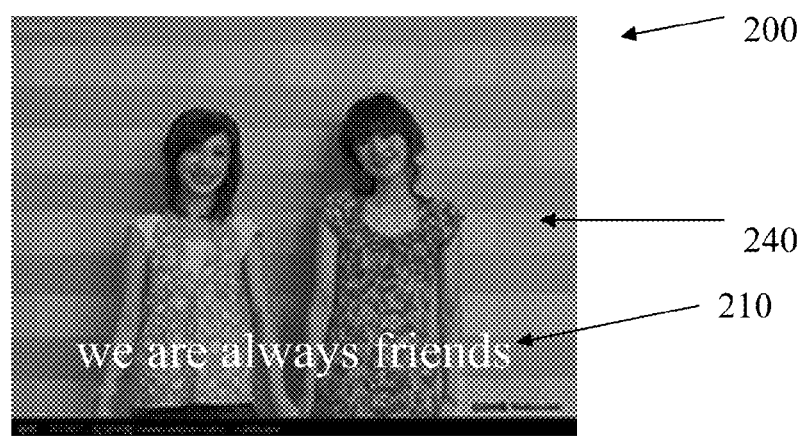

Step S6 is to perform a binarization process on the character region if the local background is not a complex background. Since the local background is not a complex background, the local background is not inclined to be confused with the character, such as shown in FIG. 4. Therefore, an adaptive threshold may be used to perform the binarization process on the character region so that the local background and the character 210 in the character region are distinguished. If the angle of inclination of the character 210 obtained in Step S1 is not 0 in the character region, tilt correction may be performed on the binarized character region according to the angle of inclination.

Step S7 may include a layout analysis and single character segmentation on the binarized character region. Each character in the character region may be extracted and recognized. The recognition result may then be output. Before recognition of an extracted character, the extracted character may be normalized, and a feature of the character may be extracted and recognized. The layout analysis and single character segmentation on the character region may be similar to that in Step S5 described above, which is not repeated here.

In the character recognition method according to this embodiment, firstly, it is determined whether the local background of the character region is a complex background. Then the extraction and recognition of the character may be performed by different methods depending on whether the local background is a complex background or the local background is not a complex background. Thus, a better balance between accuracy and efficiency in extracting and recognizing the character 210 in the image 200 may be obtained.

Third Embodiment

Figure 17:
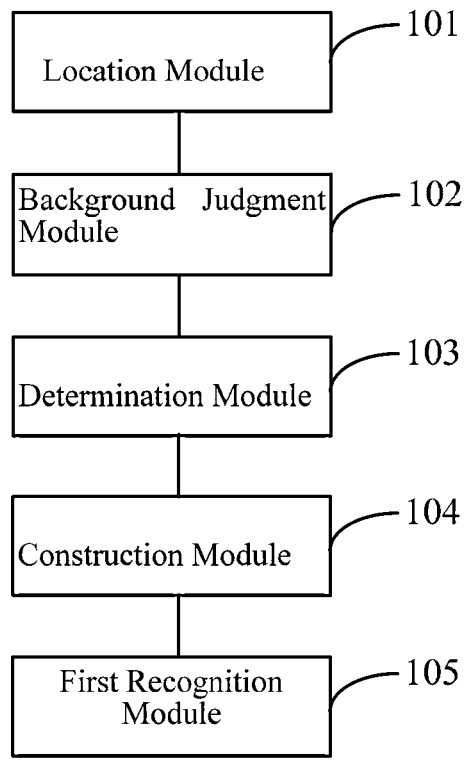
FIG. 17 is a block diagram of an example character recognition device according to a third embodiment.

FIG. 17 is a block diagram of an example character recognition device, or apparatus, or system, according to a third embodiment. The character recognition device 100 may include components, elements, units, or modules such as a location module 101, a background judgment module 102, a determination module 103, a construction module 104 and a first recognition module 105. Each listed component, or module may be hardware, for example circuitry, such as Application Specific Integrated Circuit (ASIC), field programmable gate array (FPGA), one or more processors, digital electronics, or any other type of hardware. For example, each listed module may be circuitry, such as processor, memory, communication interfaces, integrated circuits, antennas, resistors, capacitors, and/or a combination of any other hardware components. Alternatively or in addition, each above-mentioned module may include software, such as a computer program or a program segment configured to execute one or more specific functions. For example, each module may include instructions and/or data that may be stored on memory. The instructions and/or data may control operations of the respective module. The instructions may be computer executable. The data may include parameters and/or preset conditions associated with the respective module. Furthermore, the division of each above-mentioned module does not mean that the actual device and/or program codes must be divided.

The location module 101 may acquire the image 200, and locate a character region of the image 200. Parts of the character region except the character itself form a local background. The location module 101 may further acquire the position coordinate of the character region, the stroke information of the character, and the angle of inclination of the character.

The background judgment module 102 may judge whether the local background is a complex background. The background judgment module 102 may generate a binary graph according to the position coordinate of the character region and the stroke information of the character. The binary graph may include a first pixel group whose gray level is a first preset value and a second pixel group whose gray level is a second preset value. The first pixel group may represent the character 210 in the image and the second pixel group may represent other parts of the image other than the character, i.e., the whole background 240. The background judgment module 102 may further perform an expansion process on the generated binary graph.

The background judgment module 102 may determine pixels corresponding to the local background in the character region based on the binary graph. The background judgment module 102 may further compute histogram statistics for each color channel on the pixels corresponding to the local background. The background judgment module 102 may determine the main color of the local background based on the histogram statistics. The background judgment module 102 may further determine count of the total number of the pixels corresponding to the main color of the local background. The background judgment module 102 may calculate the first ratio as the ratio of the total number of the pixels corresponding to the main color of the local background to the total number of the pixels of the local background. If the first ratio is less than a first threshold, the background judgment module 102 may adjudge that the local background as a complex background.

If the first ratio is not less than the first threshold, the background judgment module 102 may compare the first ratio with a second threshold. If the first ratio is not larger than the second threshold, the background judgment module 102 may determine the pixels corresponding to the whole background of the image based on the binary graph, and perform the histogram statistics for the color of each color channel of the pixels corresponding to the whole background 240. The background judgment module 102 may further determine the main color of the whole background 240. The background judgment module 102 may then count the total number of the pixels corresponding to the main color of the whole background 240. Based on the count, the background judgment module 102 may calculate the second ration as the ratio of the total number of the pixels corresponding to the main color of the whole background 240 to the total number of the pixels of the whole background 240. If the second ratio is less than a third threshold, the background judgment module 102 may adjudge the local background as a complex background.

The determination module 103 may determine the color of the character if the local background is a complex background. The determination module 103 may determine the pixels corresponding to the character 210 based on the binary graph 600. The determination module 103 may then compute statistics for the colors of the pixels corresponding to the character 210, and may cluster the colors of the pixels to obtain the color of the character.

The construction module 104 may construct a selected region as a mask for the character by combining the color of the character and the character region. The construction module 104 may calculate the distance of the color of each pixel from the color of the character in the character region. The construction module 104 may generate a color distance graph by using the distance as the color value of the pixel. The construction module 104 may then perform a binarization process on the color distance graph to obtain the mask. In an example, the construction module 104 may perform a local-adaptive binarization process on the color distance graph. The construction module 104 may further remove spot noise from the mask and perform tilt correction on the character region and/or on the mask according to the angle of inclination of the character 210.

The first recognition module 105 may extract the character 210 from the character region by using the mask. The first recognition module 105 may further recognize the character 210 and output the recognition result. Before the extraction and recognition of the character 210, the first recognition module 105 may performs layout analysis and single character segmentation on the mask. The first recognition module 105 may extract each character from the character region by using the mask and recognize the extracted characters. In order to remove noise influence, the first recognition module 105 may further perform an expansion process on the mask.

After the character is extracted, the first recognition module 105 may normalize the extracted character prior to recognition of the character.

The specific implementation process of each above-mentioned module may further refer to the character recognition method according to the first embodiment of the invention, which is not repeated here.

The character recognition device 100, according to this embodiment, may locate the character region in the image 200. If the background of the character 210 in the character region is adjudged a complex background, the character recognition device 100 may construct a mask for the character 210. The mask may be constructed depending on the color of the character and the character region. The character recognition device 100 may extract the character 210 by using the mask. The extracted character may then be recognized. The character recognition device 100 may thus, accurately recognize a character in a complex background.

Fourth Embodiment

Figure 18:
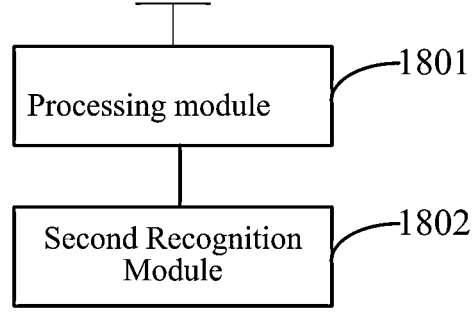
FIG. 18 is a block diagram of an example character recognition device according to a fourth embodiment.

FIG. 18 illustrates a block diagram of an example character recognition device 1800 according to the fourth embodiment. The character recognition device 1800, in addition to the modules described in the third embodiment, further includes a processing module 1801 and a second recognition module 1802.

The processing module 1801 may perform a binarization process on the character region if the local background is not a complex background. The processing module 1801 may further perform tilt correction on the character region depending on the angle of inclination of the character.

The second recognition module 1802 may perform layout analysis and single character segmentation on the binarized character region. The second recognition module 1802 may further extract each character in the character region, recognize the extracted characters, and output the recognition result.

The specific implementation process of each above-mentioned module may further refer to the character recognition method according to the second embodiment of the invention, which is not repeated here.

The character recognition device 1800 according to this embodiment, may adjudge whether the local background of the character region is a complex background. The extraction and recognition of the character 210 may be performed by separate methods depending on whether the local background is a complex background or the local background is not a complex background. The separate methods may enable a balance between accuracy and efficiency of extracting and recognizing the character in the image 200.

An embodiment may include a computer readable storage medium, in which computer executable instructions are stored. The above-mentioned computer readable storage medium may be, for example, a non-volatile memory, such as an optical disk, a hard disk, or a flash memory. The computer executable instructions may be adapted to achieve, by a computer or the similar operation device, various operations and steps described in the above-mentioned character recognition method.

The sequence numbers of the above embodiments of the disclosure are only for the purpose of description, and do not represent one embodiment is superior to another.

The character recognition device, apparatus, or system, 100 may be implemented in many different ways. Each module, or component, such as the location module 101, the background judgment module 102, the determination module 103, the construction module 104, and the first recognition module 105, may be hardware or a combination of hardware and software. For example, each component may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each component may include memory hardware that comprises instructions executable with a processor to implement one or more of the features of the component. When any one of the component includes the portion of the memory that comprises instructions executable with the processor, the component may or may not include the processor. In some examples, each component may just be the portion of the memory that comprises instructions executable with the processor to implement the features of the corresponding component without the component including any other hardware. Because each module includes at least some hardware even when the included hardware comprises software, each component may be interchangeably referred to as a hardware component, such as the location hardware, the background judgment hardware, the determination hardware, the construction hardware, and the first recognition hardware.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The invention claimed is:

1. A character recognition method implemented on a processor and a memory, the memory including instructions to configure the processor to perform the method comprising:
   acquiring an image and locating a character region in the image by the processor, wherein the character region comprises a character and a local background;
   calculating, by the processor, a first ratio comprising a ratio of number of pixels corresponding to a main color of the local background and a total number of pixels of the local background;
   determining, by the processor, that the local background is a complex background in response to the first ratio being less than a first threshold;
   calculating, by the processor, a second ratio comprising a ratio of number of pixels corresponding to a main color of a whole background of the image and a total number of pixels of the whole background in response to the first ratio not being less than the first threshold;
   determining, by the processor, that the local background is a complex background in response to the second ratio being less than another threshold;
   determining, by the processor, a color of the character in response to the local background being a complex background;
   constructing, by the processor, a mask for the character by combining the color of the character and a color of the character region;
   extracting, by the processor, the character from the character region by using the mask; and
   recognizing the character and outputting the recognition result by the processor.

2. The character recognition method according to claim 1, further comprising:
   acquiring a position coordinate of the character region and stroke information of the character by the processor.

3. The character recognition method according to claim 2, further comprising:
   generating, by the processor, a binary graph according to the position coordinate of the character region and the stroke information of the character, wherein the binary graph comprises a first pixel group comprising pixels set at a first preset gray level, and a second pixel group comprising pixels set at a second preset gray level, wherein the first pixel group represents the character in the image and the second pixel group represents the whole background of the image.

4. The character recognition method according to claim 3, further comprising:
   performing, by the processor, an expansion process on the generated binary graph.

5. The character recognition method according to claim 4, wherein the number of pixels corresponding to the main color of the local background is determined by:
   determining, by the processor, pixels corresponding to the local background in the character region based on the binary graph;

determining, by the processor, statistics for each color channel of the pixels corresponding to the local background, and determining the main color of the local background;

counting, by the processor, the number of the pixels corresponding to the main color of the local background.

6. The character recognition method according to claim 5, further comprising:

comparing, by the processor, the first ratio with a second threshold in response to the first ratio not being less than the first threshold;

wherein the number of pixels corresponding to the main color of the whole background is determined by:

determining, by the processor, pixels corresponding to the whole background of the image based on the binary graph in response to the first ratio not being larger than the second threshold;

determining, by the processor, statistics for each color channel of the pixels corresponding to the whole background, and determining the main color of the whole background;

counting, by the processor, the total number of the pixels corresponding to the main color of the whole background.

7. The character recognition method according to claim 3, wherein the determination of the color of the character comprising:

determining, by the processor, the pixels corresponding to the character based on the binary graph;

determining, by the processor, statistics for the colors of the pixels corresponding to the character; and determining, by the processor, the color of the character by clustering the colors of the pixels of the character.

8. The character recognition method according to claim 7, wherein the construction of the mask comprising:

calculating, by the processor, a distance of the color of each pixel in the character region from the color of the character;

generating, by the processor, a color distance graph by using the distance as color value of pixels in the color distance graph; and constructing, by the processor, the mask by binarization of the color distance graph.

9. The character recognition method according to claim 8, wherein the binarization of the color distance graph further comprises:

performing a local-adaptive binarization process on the color distance graph.

10. The character recognition method according to claim 8, wherein the constructing the mask further comprises:

removing spot noise from the mask.

11. The character recognition method according to claim 1, wherein locating the character region further comprises:

detecting an angle of inclination of the character.

12. The character recognition method according to claim 11, wherein after the construction of the mask, the method further comprises:

performing tilt correction on the character region and on the mask according to the angle of inclination.

13. The character recognition method according to claim 1, further comprising:

performing, by the processor, layout analysis and single character segmentation on the mask before extracting each character from the character region by using the mask and recognizing each extracted character.

14. The character recognition method according to claim 1, further comprising:

performing, by the processor, an expansion process on the mask.

15. The character recognition method according to claim 1, further comprising:

normalizing the extracted character and recognizing the character by the processor.

16. The character recognition method according to claim 11, further comprising:

performing, by the processor, a binarization process on the character region in response to the local background not being a complex background; and performing a layout analysis and single character segmentation on the binarized character region, extracting each character in the binarized character region and recognizing the each character, and outputting the recognition result by the processor.

17. The character recognition method according to claim 16, wherein after performing binarization process on the character region, the method further comprises:

performing tilt correction on the character region according to the angle of inclination.

18. A character recognition device, comprising a processor and a memory, the memory including instructions to configure the processor to comprise:

a location component configured to acquire an image, and locate a character region of the image, wherein the character region comprises a character and a local background;

a background judgment component configured to:

calculate a first ratio comprising a ratio of number of pixels corresponding to main color of the local background and a total number of pixels of the local background;

determine the local background is a complex background in response to the first ratio being less than a first threshold;

calculate a second ratio comprising a ratio of number of pixels corresponding to main color of a whole background of the image and a total number of pixels of the whole background in response to the first ratio not being less than the first threshold; and determine the local background is a complex background in response to the second ratio being less than another threshold;

a determination component configured to determine a color of the character in response to the local background being identified as a complex background;

a construction component configured to construct a mask for the character by combining the color of the character and a color of the character region; and a first recognition component configured to extract the character from the character region by using the mask, to recognize the character, and further to output the recognition result.

19. The character recognition device according to claim 18, wherein the location component is further configured to:

acquire coordinates of the character region and stroke information of the character.

20. The character recognition device according to claim 19, wherein the background judgment component is further configured to:

generate a binary graph according to coordinates of the character region and the stroke information of the character, wherein the binary graph comprises a first pixel group with pixels set at a first preset value and a second pixel group with pixels set at a second preset value, the first pixel group corresponding to the character in the image and the second pixel group corresponding to the whole background of the image.

* * * * *